United States Patent [19]

Kreft et al.

[11] Patent Number: 5,264,654
[45] Date of Patent: Nov. 23, 1993

[54] METHOD AND APPARATUS FOR PROCESSING CONTAMINATED SOILS

[75] Inventors: Wilfried Kreft; Franz-Josef Grothaus, both of Ennigerloh, Fed. Rep. of Germany

[73] Assignee: O&K Orenstein & Koppel AG, Berlin, Fed. Rep. of Germany

[21] Appl. No.: 678,370

[22] PCT Filed: Oct. 6, 1989

[86] PCT No.: PCT/EP89/01172
§ 371 Date: Apr. 29, 1991
§ 102(e) Date: Apr. 29, 1991

[87] PCT Pub. No.: WO90/04470
PCT Pub. Date: May 3, 1990

[30] Foreign Application Priority Data

Oct. 29, 1988 [DE] Fed. Rep. of Germany ....... 3836899

[51] Int. Cl.⁵ .................. A62D 3/00; F23G 5/12; F23G 7/00; E02D 15/00
[52] U.S. Cl. .................. 588/205; 588/211; 588/213; 588/217; 588/234; 588/235; 588/241; 588/245; 588/251; 588/900; 110/229; 110/236; 110/341; 405/248; 405/263
[58] Field of Search .............. 588/205, 209, 210, 217, 588/213, 214, 220, 228, 229, 230, 234, 235, 240, 245, 251; 405/128, 129, 248, 263; 423/659, DIG. 20; 110/229, 236, 341

[56] References Cited

U.S. PATENT DOCUMENTS

| 4,582,004 | 4/1986 | Fey et al. | 588/210 |
| 4,750,436 | 6/1988 | Maury et al. | 110/236 |
| 4,793,937 | 12/1988 | Meenan et al. | 110/236 |
| 4,794,871 | 1/1989 | Schmidt et al. | 110/246 |

FOREIGN PATENT DOCUMENTS

0155022 9/1985 European Pat. Off. .
0197577 10/1986 European Pat. Off. .
0253079 1/1988 European Pat. Off. .
3447079 3/1986 Fed. Rep. of Germany .

*Primary Examiner*—Gary P. Straub
*Attorney, Agent, or Firm*—Spencer, Frank & Schneider

[57] ABSTRACT

A method of and apparatus for decontaminating contaminated soils and similar materials, the method includes (a) drying and comminuting contaminated soil and similar material in a mill through which a flow of hot gases is passed to provide a mixture of solids and gases; (b) introducing the mixture into a cyclone separator where the mixture is separated into gaseous and solid components; (c) thermally treating the solid components in a decontamination zone at a temperature effective to decontaminate at least a portion of the solid components; (d) passing the solid components after thermally treating same in step (c) into a dwell zone configured as a flow-through region; (e) thermally treating the solid components within the dwell zone at a temperature effective to decontaminate at least a portion of the solid components; (f) cooling the solid components after step (e) by transferring same into a cooling region of a cooling line; (g) thermally afterburning gaseous components from at least one of steps (b) and (c) in a burner; (h) cooling and filtering at least a part of the gaseous components from step (g); and (i) discharging the gaseous components from step (h) to the atmosphere.

19 Claims, 4 Drawing Sheets

METHOD AND APPARATUS FOR PROCESSING CONTAMINATED SOILS

BACKGROUND OF THE INVENTION

1. Field of the Invention

The invention relates to a method of processing contaminated soils and similar materials, particularly from coke making locations, by removing, decontaminating and possibly replenishing the removal location with purified soil in such a manner that the removed soil is dried and comminuted in a mill through which hot gases flow, the solids/gas mixture is introduced into a cyclone separator and is there separated into gaseous and solid components; the solids are thermally treated at a high temperature, are then cooled and possibly employed to replenish the removal location; and, after being subjected to a cooling and filtering process, the exhaust gases are discharged, at least in part, to the atmosphere.

2. Background of the Related Art

It is known to excavate rivers in order to remove deposits therein and to introduce the material, after preprocessing it by comminuting it in a crusher and screening it, into a rotary kiln system. The rotary kiln system is composed of two series connected revolving drums, the first one of which operates as a drying drum to pre-dry the material. The second rotary kiln following in the stream of material is fired by an open flame which acts directly on the solids to be purified at temperatures between 400° C. and 800° C. The purified soil is removed from the rotary kiln and installed again at the location where it was obtained.

After the dust components contained therein have been removed, the exhaust gases generated in the rotary kiln system are heated in a combustion chamber equipped with a separate burner to about 1200° C. and are thus decontaminated. After subsequent cooling and filtering, the purified exhaust gases are discharged to the atmosphere. Part of the exhaust gases are fed to the rotary drying drum to intensify the drying process and to improve the energy balance. The drawback noted in the prior art method is that the preprocessing by crushing and screening does not produce sufficiently small grain sizes in the contaminated material so that the subsequent drying process step is ineffective.

In the subsequent process step of directly charring the solids by a flame in the rotary kiln, there exists the additional drawback that uniform heating does not take place, rather streaks of cold gas develop which result in untreated streaks of solids in the discharged material, the latter thus being purified only insufficiently. Finally, the temperatures realized in a rotary kiln system are not sufficient to decompose all noxious substances so that the thus purified soil no longer meets present requirements for environmental protection. Also, the return of purified hot exhaust air to the drying drum through a branch provided downstream of the second burner is unfavorable from an energy engineering point of view.

German Laid-Open Patent Application 3,623,939 which corresponds to U.S. Pat. No. 4,750,436, discloses a method and an apparatus operating according to the method for processing contaminated soils and similar materials by removing, decontaminating and replenishing the removal location with purified soil, wherein the removed material, possibly after pre-processing, is dried and then thermally treated at a high temperature. In a mill through which hot gases flow, the drying is combined with comminution of the material to a grain size range from 0 to 10 mm in such a manner that a significant portion of the contaminants are transferred into the gas phase. After drying, the material together with the gas phase is treated in the form of a solids/gas dispersion in a burner-equipped heating and decontamination line at a temperature in a range between 800° C. and 1200° C. and is subsequently separated in a cyclone separator stage from the gas phase containing all of the noxious substances, with the gas phase being included in the circuit with the burner to completely decompose the noxious substances. A partial stream of the combustion gases is fed to the combined drying and comminution stage, while the purified solids are discharged after cooling. The cooling air is fed to the burner as preheated primary air.

The drawbacks of the prior art discussed are essentially that the circuitry of the system components only permits a combustion temperature, with respect to the solids, of a maximum of 800° C. Periods of dwell of only two seconds are realized for the solids in the decontamination line. This relatively short passage time is only sufficient, however, to decontaminate a grain size range of <3 mm at a temperature of 800° C. so that the easily volatile components can be separated from the solid. For grain sizes above 3 mm, it may even happen that sufficiently thorough heating cannot be realized in this short period of passage, even to remove the easily volatilized components from the solid. Aromatic hydrocarbons, aliphatic hydrocarbons, cyanides, easily volatilized heavy metals, PCB's and chlorinated hydrocarbon cannot be removed during this short passage time and at these temperatures.

Another drawback is that the hot gas circulation between decontamination and burner is a stress for the fan employed. Moreover, the large quantity of dust in the separated gases also constitutes a strain on the burner, with the resulting percentage of filter dust to be disposed of making the process more expensive.

Based on German Laid-Open Patent Application 3,623,939, it is the object of the invention to provide an improved method, as well as apparatus, for processing contaminated soils and similar materials particularly from coke making locations, by removing, decontaminating and possibly replenishing the removal location with purified soil in such a way that the removed sol is dried and comminuted in a mill through which hot gases flow, the solids/gas mixture is introduced into a cyclone separator and is there separated into gaseous and solid components; the solids are thermally treated at a high temperature, are subsequently cooled and possibly employed to replenish the removal location; and at least part of the exhaust gases are discharged to the atmosphere after having undergone a cooling and filtering process, in that the flow path is decoupled without the gas being circulated between the decontamination line and the combustion chamber. In order to increase the flexibility, that is, the degrees of freedom of the combustion system so that substances, such as easily volatized heavy metals, PCB's, CHC and the like can be destroyed thermally, it is desirable to modify the combustion system. Also the atmosphere in the entire system should be as dust-free as possible to thus prevent the formation of a molten phase and clogging in the combustion chamber.

SUMMARY OF THE INVENTION

This is accomplished with respect to the process in that the solid components are introduced, subsequent to the decontamination, into a dwell zone configured as a passage region and are there treated further at temperatures essentially corresponding to the decontamination temperature to then be introduced into the region of the cooling line; and the exhaust gases from the drying mill and/or the decontamination are again subjected to thermal afterburning.

Modifications of the process according to the invention includes, in dependence on the degree of contamination, passing the solid components through the well zone in a period of time between 5 seconds and 10 minutes.

The method may include charging the mill with hot gas of at most 700° C. and heating the fraction, in dependence on its initial moisture content, to about 100° C. to 300° C.; heating the solid components in the region of the decontamination line to about 800° C. to 1100° C. in dependence on the degree of contamination to decontaminate same; and maintaining the temperature of the decontamination line in the region of the dwell zone essentially without further influx of external heat.

The method may include clearing the exhaust gases from the drying mill and/or the decontamination line of dust at least in part and subjecting same to thermal afterburing; and conducting the flue gases from the thermal afterburning process through a gas cooler and introducing same into the filter device where the filter dust, on the one hand, and the dust from the preliminary dust removal, on the other hand, are returned at least in part into the region of the decontamination line.

The method may include mixing the part of the exhaust gases from the drying mill from which the dust was not removed with part of the flue gases from the thermal afterburning process and making same available to the mill as heating gas.

The method may include conducting the exhaust gases from the drying mill, as well as the flue gases from the thermal afterburning process, through a heat exchanger; conducting the heated exhaust gases from the drying mill into the region of the decontamination line and bringing same there to the decontamination temperature; and introducing the flue gases, after passing same through the heat exchanger, into a flue gas dust removal system and, in dependence on the degree of contamination of the materials to be purified, feeding same to a flue gas sulfur removing system and/or a flue gas nitrogen removing system.

The method may include introducing the flue gases from the thermal afterburning process, subsequently to passing same through the heat exchanger, into the filter device, with the filter dust being returned to the region of the decontamination line.

The method may include removing the dust content of the gases separated by the cyclone separator subsequent to their decontamination and subjecting same to thermal afterburning, with the dust being charged downstream of the dwell zone.

The method may include effecting the energy supply of the drying mill by means of the heat discharged from the cooling device, with at least one further hot gas generator being added in dependence on the moisture content of the materials to be decontaminated.

The method may include utilizing energetically the thermal energy from the thermal afterburning process, particularly to generate steam, to generate current or for remote heating purposes.

Further, the method may include making available the energy discharged by the heat exchanger as primary or secondary energy, respectively, for the burner or burners and/or to the mill.

The method features permit the problem-free thermal treatment of solid which are contaminated with organic contaminants, particularly aliphatic and aromatic hydrocarbons, polycyclic aromatic hydrocarbons, phenol compounds and derivatives cyanide compounds, and halogen-organic compounds as well as easily volatilized heavy metal compounds and similar wastes, since the incorporation of a dwell zone permits the period of dwell to be extended into the range of minutes. The setting of the period of dwell is here regulated as a function of the degree of contamination of the soils and waste materials. In contrast to the prior art, circulating gas between decontamination and burner is eliminated due to the change in the gas flow. The gases supplied to the burner are first subjected to a dust removal process. The resulting filter dust is returned at least in part into the decontamination region.

Compared to the rotary kiln processes, the method according to the invention achieves a reduction in the consumption of energy, lower investment costs as well as a more compact structure. Compared to German Laid-Open Patent application 3,623,939, a better purification effect is realized, on the one hand, for the solids, as well as the exhaust gases, and, on the other hand, there is less susceptibility to malfunction.

The apparatus according to the invention for processing contaminated soils and similar materials by removing, decontaminating and possibly replenishing the removal location with purified soil is characterized by a dwell zone configured as a flowthrough device for the decontaminated materials provided downstream of the decontamination line, as well as a device for thermally afterburning the exhaust gases from the drying mill and/or decontamination line.

The invention thus provides an apparatus for processing contaminated solid and similar materials by means of removal, decontamination and possibly replenishment of the removal location with purified soil, the apparatus including a drying mill, a device for thermally treating the material, at least one cyclone separator for separating the solids from the gas phase and a heating device, a cooling and dust removal device for the exhaust gases as well as a cooling device for the purified materials, characterized by a dwell zone configured as a flow-through device for the decontaminated materials, said device being provided subsequent to the decontamination line as well as a device for thermally afterburning the exhaust gases from the drying mill and/or the decontamination.

The apparatus may have the dwell zone formed by a multi-stage cyclone arrangement. The dwell zone may be formed by a turbulence layer/fluidized bed.

The apparatus may include a device for pneumatically sucking off the fine particles and the exhaust gases in the entrance region of the turbulence layer/fluidized bed. The device for thermally afterburning may be composed of a burner followed, if required, by a gas cooler, with the burner being preceded by a dust removal device for the gases from the drying mill and the decontamination, respectively.

The apparatus may have the cyclone separator followed by a heat exchanger through which can be conducted, on the one hand, the exhaust gases from the drying mill and, o the other hand, the flue gases from the thermal afterburning process. A second fuel/air intake device may be provided in the region of the decontamination line. The system blower may be connected to the cold side downstream of the heat exchanger. Finally, a jet pump may be provided upstream of the device for thermally afterburning.

By configuring the dwell zone as a multi-stage cyclone apparatus, periods of dwell of about 1 minute can be realized for the solids. A turbulence layer is able to realize solids dwell periods of several minutes. The system is preferably laid out in such a way that the finer particles are discharged pneumatically and the coarser particles—the only ones that require additional dwell time—remain in the fluidized bed.

The mill is charged with a hot gas temperature of no more than 700° C., with the material to be purified having a temperature, depending on its initial moisture content at the mill outlet, of about 100° C. to 300° C. The solids/gas dispersion is fed to a cyclone separator which separates the solids from the gaseous components. The solids mixture charged into the decontamination line is heated to 800° C. to 1100° C. and is thereafter again separated from the gaseous components in a further cyclone separator. The partially decontaminated solids are introduced into the dwell zone according to the invention where they are moved as a function of the degree of contamination for a period between 5 seconds and 10 minutes so that they will not bake on. As already mentioned, the dwell zone is composed of a multi-stage cyclone apparatus or a turbulence layer/fluidized bed. Both types have in common a heat insulated shield against the environment so as to avoid a drop in temperature. After passing through the dwell zone, the solids are introduced in the usual manner into the cooling device and are there cooled to a temperature between 100° C. and 150° C. The purified soil may be stored intermediately or incorporated directly in, the area from which it was removed. The gas may be conducted according to the variations defined in the patent claims which should be selected in dependence on the materials to be decontaminated and from a cost aspect. If heat exchangers are employed, the energy obtained here may be utilized, for example, to generate steam, to generate current or for remote heating purposes. There exists the additional possibility of making this energy available to the burner or burners and/or to the mill to thus improve the heat balance of the entire system.

In dependence on the degree of contamination of the material to be purified, it may be appropriate to take measures on the exhaust gas side to remove the nitrogen from the flue gases and/or to desulfurize the flue gases. These measures may be such, for example, that after the dust is removed from the flue gases, an activated carbon filter is connected downstream of the flue gas dust removal station to separate heavy metal compounds. The filter dusts obtained during the removal of dust from the flue gases can be introduced completely into the decontamination system. Removal of dust at this location thus becomes superfluous.

BRIEF DESCRIPTION OF THE DRAWINGS

The invention is illustrated in the drawings in the form of embodiments thereof and will now be described as follows.

DESCRIPTION OF THE PREFERRED EMBODIMENTS

Figure 1:
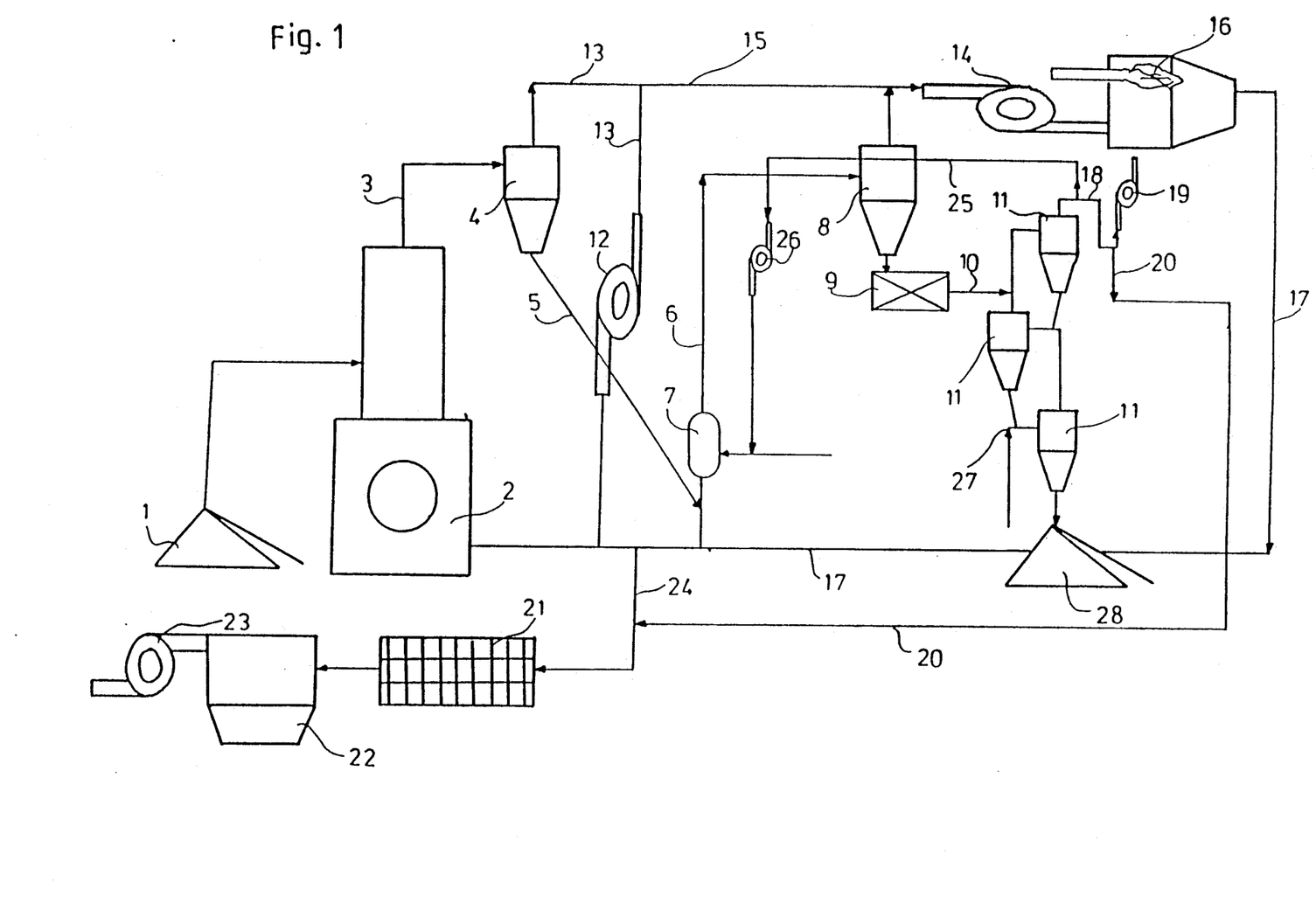
FIGS. 1 to 3 show different flow schemes for the apparatus according to the invention for processing contaminated soils.

The system according to FIG. 1 is essentially constructed of the following apparatus components:

The soils to be decontaminated are pre-broken and put into piles 1 (rough comminution). By way of loading units (excavators, conveyor belts or the like) which are not shown in detail the coarse fractions are introduced into a mill 2 through which flow hot gases and which is connected by way of a pipeline 3 with a cyclone separator 4. From there, the solids travel through a pipeline 5 into a heating and decontamination line 6 which may be configured as a combustion chute or the like. If required, further fuel and air may be supplied at 7 in the region of decontamination line 6. During the flameless combustion taking place there, the released energy is spontaneously converted to heating energy, that is, overheating of the gas phase is avoided. The heating and decontamination line 6 is followed by a further cyclone separator 8 in which the purified solids are separated from the gas phase. The solids, that is, the partially decontaminated soil, is then transferred to a dwell zone 9 which in the flow chart of FIG. 1 is shown merely as a black box. Various types of dwell zones can be found in FIGS. 4 and 5. For the present purpose, dwell zone 9 is configured as a flow-through device so that the material is prevented from baking on. Due to the extended period of dwell of the solids, which may be increased into the range of minutes in dependence on the degree of contamination, it can be ensured, with the appropriate temperature, that even contaminants posing particular problems, such as easily volatilized heavy metal compounds, PCB's and CHC, can be separated from the materials. After passage through dwell zone 9, the solids flow through a further pipeline 10 into a three-stage cooling apparatus. The three cooling stages are formed by subsequently connected cyclone separator stages 11. Through discharge devices that are not shown in detail, the stream of the solids leaves the cooling system at a temperature which lies between 100° C. and 150° C.

A first contaminated gas phase is present in cyclone separator 4. By means of a fan 12, at least some of the gas phase from cyclone separator 4 is made available through a pipeline 13 as heating gas for mill 2. The remaining gas phase of cyclone separators 4 and 8 is fed by means of a fan 14 and a pipeline 15 to a subsequently connected burner 16 and is there thermally afterburned, with complete decomposition of all contaminants being realized here. Through a pipeline 17, the flue gases from the thermal afterburning phase are made available as heating gases to mill 2, with these gases being mixed with the colder exhaust gases of the gas phase that had been extracted by fan 12 from cyclone separator 4. Mixing of the gas streams from pipelines 13 and 17 results in an approximate entrance temperature at mill 2 of at most 700° C. Exhaust gases from cooling stage 11 are made available to burner 16 as secondary air by way of a conduit 18 and a blower 19. The gas phase not made available to burner 16 is conducted through a conduit 20 to a heat exchanger 21. Here, the exhaust gases are cooled and are then discharged to the atmosphere by way of a filter 22 and a fan 23. By way of heat exchanger 21 energy can be recovered in a manner not shown in detail here in that the thermal energy from afterburner line 17 is used as energy through a further pipeline 24 (e.g., heat reduction kettle, steam generation, generation of electrical current and/or remotely supplied heat). The heated air from heat exchanger 21 may also be utilized as combustion air for burner 16 and as energy to be introduced into mill 2. Another portion of the gas phase from cooling stage 11, which is not made available to burner 16, is conducted as pre-heated air through a conduit 25 and a fan 26 into the region of the additional fuel supply 7. At 27, the cooling air required for multistage cooling device 11 is sucked in from the atmosphere and, as already mentioned, is returned at least in part into the region 7 of decontamination line 6 for the purpose of recovering the energy after passage through the cooling device.

The described system operates as follows:

In mill 2, the contaminated soils are simultaneously dried by a stream of hot gas of no more than 700° C. and are comminuted to a grain size range between 0 and 3 mm. Due to the comminution of the solids to grain sizes of <3 mm while simultaneously charging them with heat, it is ensured that the solids are heated through to the fullest extent. In dependence on the initial moisture content, the starting temperature of the solids at the outlet of mill 2 is about 100° C. to 300° C. This heating already converts a considerable amount of the contaminants to the gas phase. The comminuted material is discharged from mill 2 as a solids/gas dispersion and is fed by action of fan 12 to cyclone separator 4. Part of the gas separated there returns as heating gas to mill 2 and the other part is fed by means of jet pump 14 to burner 16 to provide for thermal afterburning. The solids that are completely dried there are transferred to the heating and decontamination line 6 and are there thermally treated at about 800° C. to 1100° C., a temperature that is sufficient to produce a first vaporization during a passage time of about 2 to 3 seconds, which enables the easily volatilized components such as, for example, solvents, BTX aromatics or the like, to be separated from the solids. The separation of the prepurified solids is effected in cyclone separator stage 8, where the gas phase is introduced into burner 16 by way of jet pump 14. The pre-purified solids now reach dwell zone 9 where they are moved, in dependence on the degree of contamination, in the minute range. Dwell zone 9 is provided with a heat-tight shield against the environment to avoid a drop in temperature. Due to the increase in the period of dwell at approximately the same temperature as in decontamination line 6 (800° C. to 1100° C.), contaminants that pose problems, such as, inter alia, easily volatilized heavy metals, PCB's and polycyclic aromatic hydrocarbons can also be evaporated out of the solids. From dwell zone 9, the now completely purified soil is moved by way of a cooling stage 11 and a discharging device not shown in detail, for example, to a stockpile 28.

Figure 2:
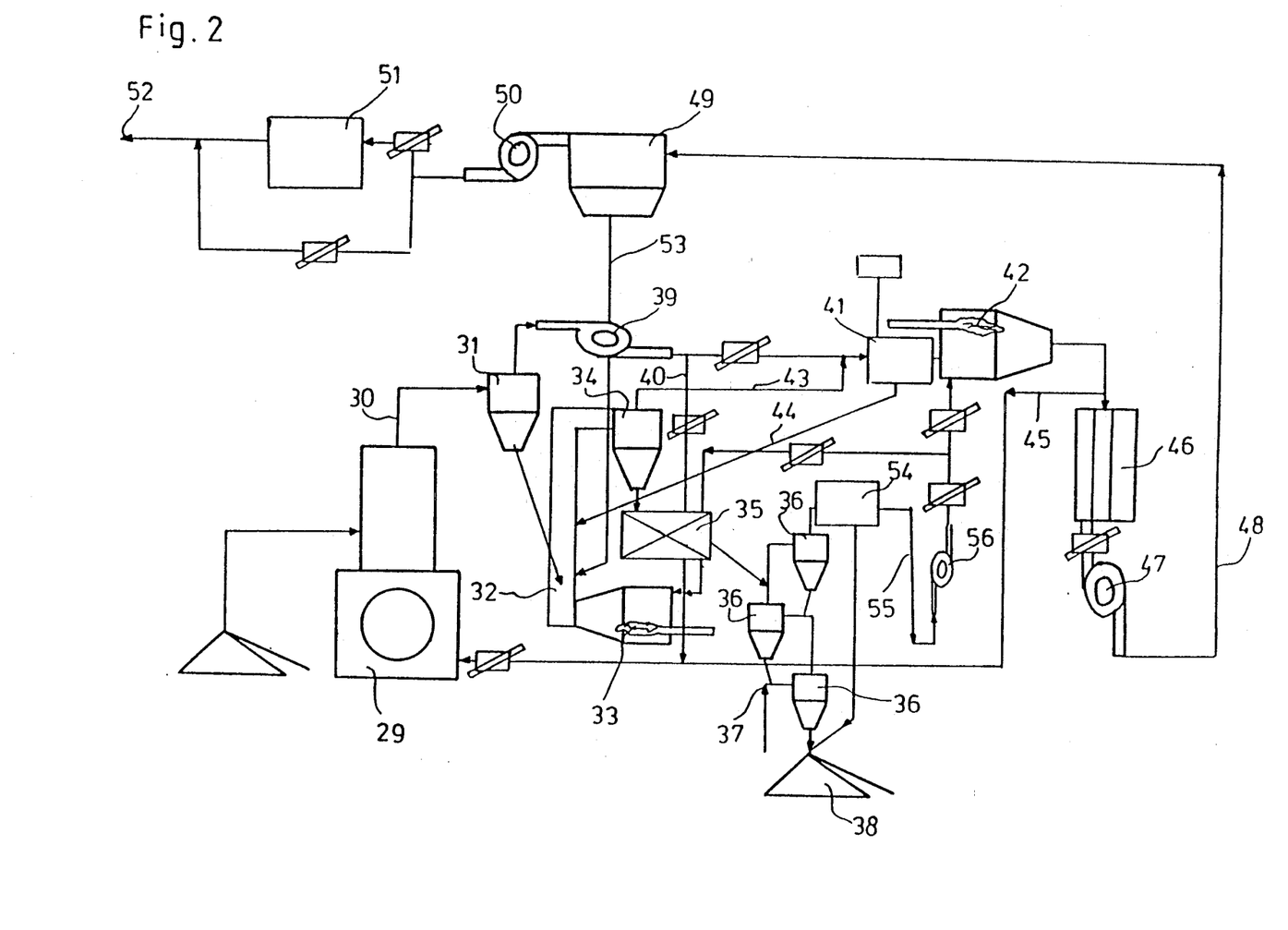

FIG. 2 shows another alternative of the apparatus according to the invention. This system is essentially composed of the following components:

The already pre-broken material is fed, as already described in FIG. 1, into a mill 29 through which flow hot gases, where it is dried, on the one hand, and comminuted, on the other hand, to fractions of <3 mm. By way of a pipeline 30, the solids-gas dispersion is introduced into a cyclone separator 31 from where the solids are brought into the region of decontamination line 32. There, a burner 33 is provided which generates the appropriate temperature level (800° C. to 1100° C.) in decontamination line 32. Decontamination line 32 is preferably configured as a combustion chute. As already mentioned in FIG. 1, during the passage of the material, a first decontamination takes place here. The prepurified solids then enter a cyclone separator 34 where the solids are again separated from the gas phase. The purified solids are now transferred into a dwell zone 35 again shown as a black box which is described in greater detail in FIGS. 4 and 5. Here again the temperatures generated in decontamination line 32 are essentially maintained so that the dwell period can be varied from seconds to minutes as a function of the degree of contamination of the material. The thus purified solids now enter a multi-stage cooling device 36, with the cooling air being introduced into the system from the atmosphere at location 37. The purified solids are transferred by way of discharging devices which are not shown in detail to a stockpile 38. The exhaust gases and residues are conducted as follows:

The solids/gas mixture coming from the drying mill 29 is sucked in by way of a fan 39 and is at least in part made available again as heating gas to mill 29 through a pipeline 40. The gas portion not made available to mill 29 travels through a dust removal device 41 to a burner 42 where a thermal afterburning process takes place. The same applies for the gas phase coming from cyclone separator 34 which is also introduced through a conduit 43 into dust removal device 41 and is afterburned in burner 42. The dust generated there, which may under certain circumstances be highly contaminated, is returned at least in part into decontamination line 32 through a pipeline 44. The flue gases resulting from the thermal afterburning, which have an exit temperature of approximately 1200° C. are separated. By way of a pipeline 45, a part of the flue gases is mixed with the exhaust gases from cyclone separator 31 and made available as heating gas to mill 29. The hot gas temperature present at the mill inlet amounts to a maximum of 700° C. The part of the flue gas not made available to mill 29 travels through a gas cooler 46, a further fan 47, as well as conduit 48 into a filter 49 from where the purified exhaust gases are introduced by way of a fan 50 and a filter for heavy metals 51 to chimney 52. The dusts from filter 49 are charged through a conduit 53 directly into decontamination line 32. Cooling stage 36 also has an associated dust removal device 54, with the still dust-shaped components present here being turned over directly to stockpile 38 since they no longer constitute contamination. The gaseous components leaving cooling stage 36 are returned as secondary air to burner 42 by way of a conduit 55 and a fan 56.

Figure 3:
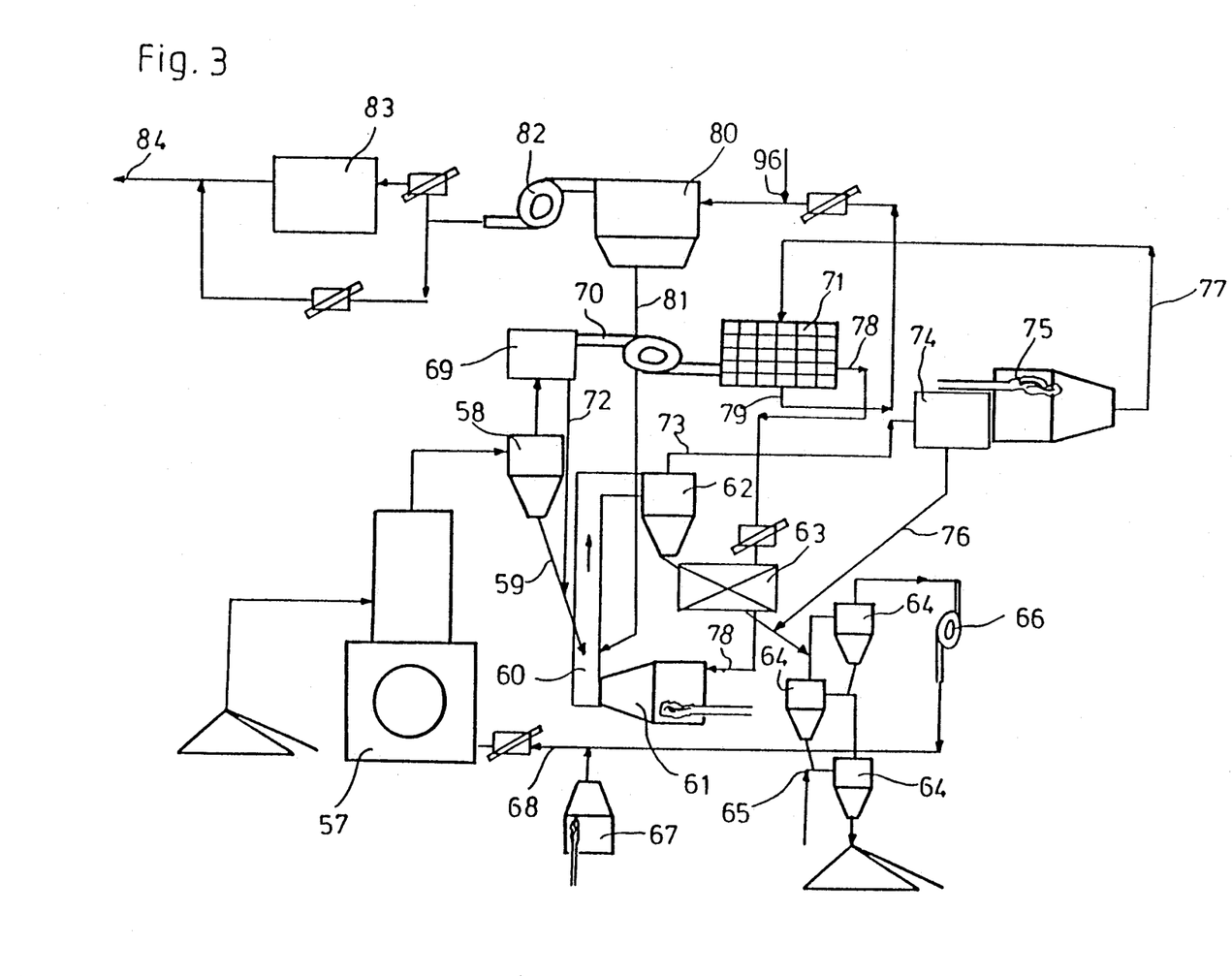

FIG. 3 shows a further alternative. As already described in the preceding figures, the prepared material is again introduced into a mill 57 through which flows hot gas and where a fraction of <3 mm is produced. The thus pre dried mixture is fed into a cyclone separator 58 that separates the solid phase from the gas phase. The solids travel through a conduit 59 into the region of decontamination line 60 which is heated by means of a burner 61 (800° C. to 1100° C.). In this decontamination line, the easily volatilized contaminants are evaporated out due to the relatively short period of dwell (about 2 to 3 seconds). The mixture then enters a cyclone separator 62 where a further separation of the solid phase from the gas phase takes place. As already discussed in FIGS.

1 and 2, the solid phase travels into a dwell zone 63 shown here again only as a black box, with it being possible again to remove at essentially the same temperature as in decontamination line 60 the problem causing contaminants in dependence on the degree of contamination. Subsequent to dwell zone 63, the now purified solids are introduced into a multi-stage cooling device 64 where they are cooled from an entrance temperature of about 800° C. to 1100° C. to about 100° C. to 150° C. The cooling air required for this purpose is taken from the atmosphere at location 65 and, after passing through cooling stage 64 is made available by way of a fan 66 as heating gas for mill 57. If the energy discharged from cooling stage 64 should not be sufficient to ensure complete drying in mill 57, a further hot gas generator 67 may be included in hot gas conduit 68. The gas phase separated in cyclone 58 is fed by way of a filter 69 and a fan 70 to a heat exchanger 71. Filter dusts developing in filter 69 are charged through a conduit 72 into conduit 59 and are thus introduced directly into decontamination line 60. The gas phase separated in cyclone 62 is also fed through a further conduit 73 into a dust removal device 74 and is then thermally afterburned in a burner 75. Dusts appearing here, which no longer contain any contaminants, are charged through a conduit 76 directly into the region of cooler 64. The exhaust gases coming from the drying mill, which had been introduced into heat exchanger 71 through filter 69, are heated by the flue gases from the thermal afterburning process, which have an approximate temperature level of 1200° C., in a conduit 77 and, after passing through heat exchanger 71, are made available as primary air by way of a further conduit 78 to burner 61. The exhaust gases from the thermal afterburning process are fed by way of an exhaust gas conduit 79 to a filter 80, with the exhaust gases 96 being cooled by means of air and/or water before entering into the filter. The filter dust generated in filter 80 is returned through a conduit 81 into the region of decontamination line 60. The thus purified exhaust gas is conducted by a fan 82 and possibly also through a filter for heavy metals 83 and then into the chimney 84.

Figure 4:
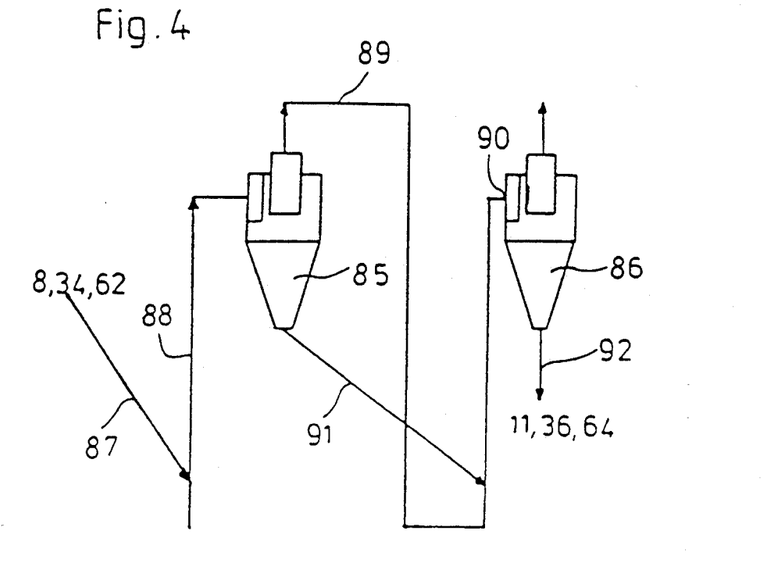
FIGS. 4 and 5 show various configurations of dwell zones.
Figure 5:
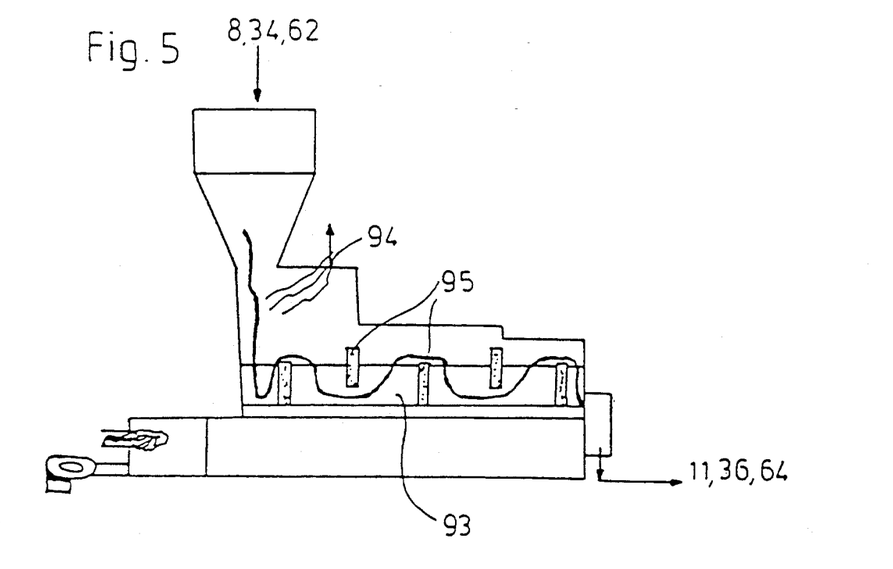

FIGS. 4 and 5 show dwell zones (as they are discussed in FIGS. 1 to 3 as black boxes 9, 35, 63).

FIG. 4 shows a dwell zone configured as a multistage cyclone device 85, 86. The solids discharged from cyclones 8, 34, 62 travel through pipelines 87, 88 into the first cyclone 85, where a first separation occurs between the solid and the gas phase. The gas phase is conducted through a conduit 89 directly into the entrance region 90 of the subsequently connected second cyclone 86. The solids are conducted through a further conduit 91 also into region 90 of the second cyclone stage 86, with a further separation of the phases taking place there. In region 92, the thus purified solids are returned to the region of the respective cooling stages 11, 36, 64.

FIG. 5 shows an alternative to FIG. 4. The dwell zone shown here is configured as a turbulence layer/fluidized bed 93. The solids mixture discharged from cyclones 8, 34, 62 reaches the entrance region of the fluidized bed where fine particles sucked off, i.e., are pneumatically separated, at orifice 94. Since only the coarse particles require an additional period of dwell in fluidized bed 93, they are guided around appropriate baffles 95. A turbulence layer is able to realize periods of dwell of several minutes for the solids. After passing through fluidized bed 93, the solid streams freed of all contaminants enter into the region of the respective cooling stage 11, 36, 64.

What is claimed is:

1. A method of decontaminating contaminated soils and similar materials containing contaminants which are volatilizable at or below about 1200° C., comprising:
   a. drying and comminuting the contaminated soil and similar material in a mill through which a flow of hot gases is passed to provide a mixture of solids and gases;
   b. separating the mixture in a first separating means into gaseous and solid components;
   c. thermally treating the solid components of step (b) in a decontamination zone at a temperature effective to volatilize and remove some contaminants from the solid components;
   d. separating gases from the solid components from the output of step (c) in a second separating means;
   e. passing the solid components containing residual contaminants from step (d) through a dwell zone configured as a flow-through region and thermally shielded to maintain a temperature at about the temperature of step (c), and retaining the solid components in the dwell zone for a period of time effective to remove residual contaminants from the solid components;
   f. cooling the solid components after step (e) by transferring same into a cooling region of a cooling line;
   g. thermally afterburning gaseous components from at least one of steps (b) and (d);
   h. cooling and filtering at least a part of the gaseous components from step (g); and
   i. discharging the gaseous components from step (h) to the atmosphere.

2. The method according to claim 1, wherein the period of time effective in step (e) ranges between 5 seconds and 10 minutes.

3. The method according to claim 1, wherein the mill in step (a) is charged with a flow of hot gas having a temperature of at most 700° C. and the contaminated soil and similar material is heated to a temperature ranging between about 100° C. to about 300° C. to remove moisture; wherein the solid components in step (c) are heated in the decontamination zone to a temperature ranging between about 800° C. to about 1100° C.,; and wherein the temperature of the decontamination zone is maintained in the dwell zone in step (e) essentially without further influx of external heat.

4. The method according to claim 1, wherein, prior to step (g), at least a part of the gaseous components are preliminarily cleared of dust; wherein the gaseous components from step (g) are cooled in step (h) by being conducted through a gas cooler and are filtered by being introduced into a filter device; and wherein dust from the filter device and dust from the preliminary clearing of dust prior to step (g) are turned at least in part to the decontamination zone.

5. The method according to claim 4, wherein at least some gaseous components are not preliminarily cleared of dust prior to step (g) and said gaseous components and gases from step (g) are mixed and made available to the mill in step (a) as heating gas.

6. The method according to claim 1, wherein the gaseous components from step (b) and the gaseous components from step (g) are conducted through a heat exchanger; wherein the gaseous components from step (b) are conducted through the heat exchanger to bring them to a temperature effective to volatilize and remove some contaminants from the solid components in step (c); and wherein the gaseous components, after passing through the heat exchanger are introduced into a flue gas dust removal system and are desulfurized and treated to remove heavy metals.

7. The method according to claim 6, wherein the gaseous components from step (g), subsequent to passing through the heat exchanger, are introduced into a filter device, with filter dust from the filter device being returned to the decontamination zone.

8. The method according to claim 7, wherein the gaseous components from step (d) have their dust content removed and are subjected to thermal afterburning, with removed dust being charged downstream of the dwell zone.

9. The method according to claim 1, wherein cooling in step (h) takes place in a cooling device, and wherein the mill is heated by heat discharged from the cooling device and at least one further hot gas generator.

10. The method according to claim 1, wherein step (g) produces thermal energy which is utilized to at least one of generate steam, generate current or for remote heating purposes.

11. The method according to claim 8, wherein thermal afterburning is accomplished in at least one burner, and wherein the heat exchanger discharges energy which is made available as primary or secondary energy, respectively, for reheating gas to go to the at least one burner or the mill.

12. An apparatus for decontaminating contaminated soils and similar materials containing contaminants which are volatilizable at or below about 1200° C. by removal of same from a location and decontamination in the apparatus, the apparatus comprising:
 a. a drying mill for drying and comminuting the contaminated soils and similar materials;
 b. a first cyclone separator for separating gaseous and solid components connected to the drying mill;
 c. a heating and decontamination line including a decontamination zone connected to the first cyclone separator for receiving solid components therefrom, the decontamination zone having a temperature effective to volatilize and remove some contaminants from the solid components;
 d. a second cyclone separator connected to the heating and decontamination line for separating gases from the output of the decontaminating zone;
 e. a flow-through device for receiving solid components containing residual contaminants from the second cyclone separator, the flow-through device including a dwell zone for retaining the solid components for a period of time effective to remove residual contaminants from the solid components, and thermal shielding means for maintaining a temperature at about the temperature of the decontamination zone;
 f. a cooling device for receiving solid components from the flow-through device and cooling same;
 g. a device for receiving gaseous components from at least one of the drying mill and the heating and decontamination line, and for thermally afterburning same;
 h. a cooling device for cooling at least a part of the gaseous components from at least the device for thermally afterburning; and
 i. a dust removal device for removing dust from the gaseous components from the cooling device.

13. The apparatus according to claim 12, wherein the dwell zone is a multi-stage cyclone.

14. The apparatus according to claim 12, wherein the dwell zone is a fluidized bed apparatus.

15. The apparatus according to claim 14, wherein the fluidized bed apparatus has means for pneumatically separating fine particles and gaseous components.

16. The apparatus according to claim 12, wherein the device for thermally afterburning is composed of a burner preceded by a dust removal device for removing dust from a gaseous components received therein.

17. The apparatus according to claim 12, wherein the first cyclone separator is connected to a heat exchanger through which are conducted gaseous components from the first cyclone separator and from the device for thermally afterburning in direct heat exchange relationship.

18. The apparatus according to claim 12, wherein a means for supplying fuel and air is provided for the heating and decontamination line.

19. The apparatus according to claim 12, wherein a fan is provided upstream of the device for thermal afterburning.

* * * * *